L. F. McNETT,

Assignor, by mesne assignments, to W. H. WINN & C. C. DUSENBURY.

Corset-Clasp.

No. 8,948. Reissued Oct. 28, 1879.

*Witnesses:*

Henry Eichling

N Wells Jr

*Inventor:*

Lyman F. McNett per James A. Whitney

Atty.

N. PETERS, PHOTO-LITHOGRAPHER, WASHINGTON, D. C.

UNITED STATES PATENT OFFICE.

LYMAN F. McNETT, OF NEW YORK, N. Y., ASSIGNOR, BY MESNE ASSIGNMENTS, TO WILLIS H. WINN AND C. COLES DUSENBURY, OF SAME PLACE.

IMPROVEMENT IN CORSET-CLASPS.

Specification forming part of Letters Patent No. 199,921, dated February 5, 1878; Reissue No. 8,948, dated October 28, 1879; application filed August 20, 1879.

*To all whom it may concern:*

Be it known that I, LYMAN F. McNETT, of the city, county, and State of New York, have invented a new and Improved Corset-Clasp; and I do hereby declare that the following is a full, clear, and exact description thereof, which will enable others skilled in the art to make and use the same, reference being had to the accompanying drawings, forming part of this specification.

This invention is designed for use on ladies' corsets, &c., and is intended to provide a clasping device which will possess all the strength and firmness of the so-termed "hook and eye," and at the same time be capable of being drawn tight with all the ease and convenience of manipulation incident to the use of the lace or lacing ordinarily used in corsets.

To this end the invention consists in a hinged clasp constructed with a roller and combined in such relation with a hook and a suitable strap that by a simple pull upon the strap the lip of the clasp may be brought into the requisite proximity to the hook, in order to be clasped or caught thereon, with very great quickness and facility, the article to which the said invention is applied being by this means fastened with only a tithe of the outlay of strength, time, and attention required in the use of the fastening devices previously known.

Figure 1:
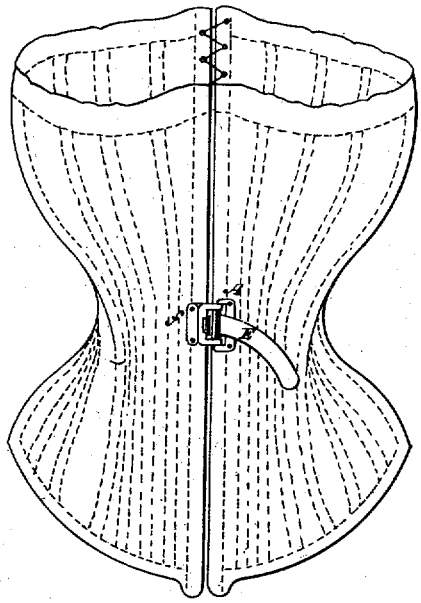
Figure 2:
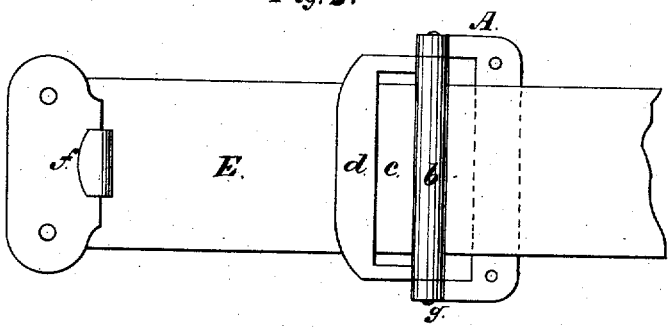

Figure 1 represents my said invention as applied to a corset, and Fig. 2, on a larger scale, represents said invention separate or detached.

A is the clasp, and *g* is a pivot attached thereto, as more fully shown in Fig. 2, there being upon said pivot a roller, *b*. Also attached—that is to say, hinged—on said pivot is a lip, *d*. The clasp A is affixed by rivets to one of the sides or parts of the corset, &c., to be fastened.

E is a strap, to which is attached a hook, *f*, and parts to be fastened. When the device is in use the strap is passed under the hinged lip *d* and under the roller *b*. By pulling the free end of the strap around the roller and toward the hook *f* the clasp is easily drawn close up to the hook *f*, so that the hinged lip *d* is readily slipped upon the hook, and thus fastens the two sides or parts to be fastened together. The tension upon the parts in articles of apparel is ordinarily sufficient to hold the lip *d* strained on the hook to a degree sufficient to keep it from slipping off.

What I claim as my invention, and desire to secure by Letters Patent, is—

1. The combination of a clasp, a roller, a hook, and a strap, all arranged substantially as herein set forth, for the purpose specified.

2. The hinged clasp A and roller *b*, in combination with the strap E and hook *f*, substantially as shown, and for the purposes set forth.

3. The combination of the clasp A, constructed with the hinged lip *d*, the roller *b*, strap E, and hook *f*, all substantially as and for the purpose herein set forth.

LYMAN F. McNETT.

Witnesses:
H. WELLS, Jr.,
THOS. J. FARRELL.